United States Patent Office 3,470,260
Patented Sept. 30, 1969

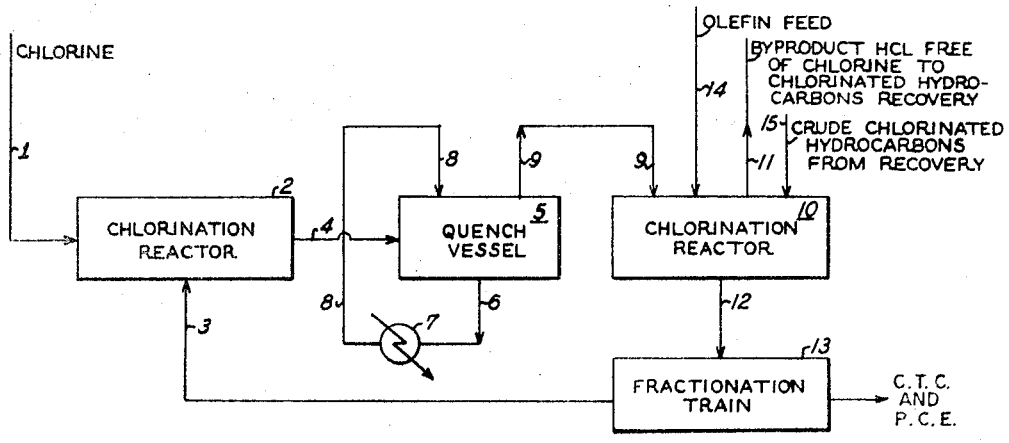
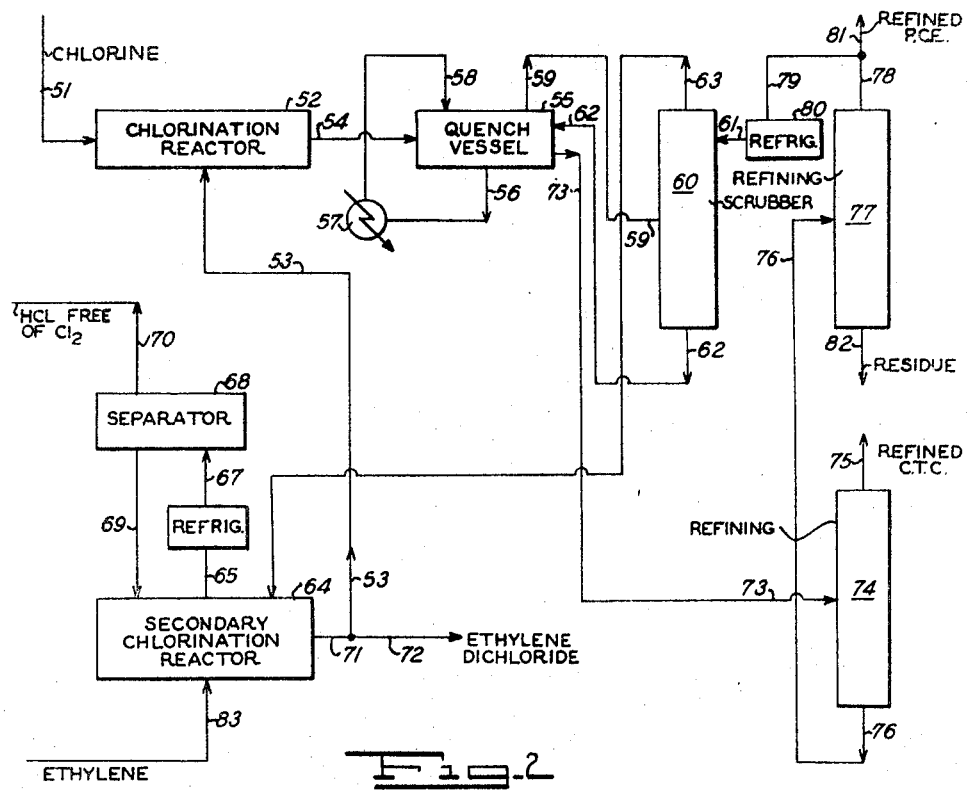

3,470,260
CARBON TETRACHLORIDE AND PERCHLORO-
ETHYLENE PROCESS
Irving E. Levine, Stamford, Conn., assignor to Halcon
International, Inc., a corporation of Delaware
Filed June 17, 1966, Ser. No. 558,356
Int. Cl. C07c 21/12, 19/06, 17/02
U.S. Cl. 260—654                                    4 Claims

ABSTRACT OF THE DISCLOSURE

The invention is directed to an improved process for the production of carbon tetrachloride and perchloroethylene. The process utilizes two chlorination zones operated under exhaustive chlorination conditions and partial chlorination conditions, respectively. Net plant feed of chlorine is introduced together with a recycle stream of partially chlorinated hydrocarbons to effect exhaustive chlorination and effluent therefrom is quenched in a liquid medium of carbon tetrachloride and perchloroethylene, which medium is continuously circulated and cooled. Gaseous effluent from the quench zone is introduced together with net plant feed of olefin to completely react with all of the molecular chlorine therein. The resultant liquid stream from the partial chlorination reactor is fractionated to provide the recycle stream to the exhaustive chlorination reactor together with product carbon tetrachloride and perchloroethylene. By-product hydrogen chloride gas free of chlorine is obtained from the overhead of the partial chlorination reactor. Where ethylene dichloride is the desired product the inventive process may be modified by introducing the effluent from the quench zone to a scrubbing column and feeding the overhead therefrom to the partial chlorination reactor. In the latter case a liquid stream is drawn off from the quench zone and fed to a refining column for production of carbon tetrachloride, the bottoms therefrom being additionally refined to produce perchloroethylene.

---

This invention relates to the manufacture of chlorocarbons by the thermal chlorination of lower boiling hydrocarbons. More specifically this invention relates to an improved process for the manufacture of carbon tetrachloride and perchloroethylene. Even more specifically this invention relates to a unique process scheme wherein the amount of chlorine in the reaction zone can be substantially increased without incurring prohibitive expense.

This invention also relates to a novel process for the co-manufacture of partially chlorinated lower hydrocarbons, carbon tetrachloride and perchloroethylene.

The thermal chlorination of lower boiling hydrocarbons to produce carbon tetrachloride and perchloroethylene is well known in the art. U.S. Patents Nos. 2,957,033, 2,989,571, 2,919,296 and 2,442,324 are among the wealth of patents in the field of carbon tetrachloride-perchloroethylene production. It is well known from these patents and other sources that hydrocarbons having from 1 to 3 carbon atoms to the molecule can be thermally chlorinated with free chlorine at temperatures in excess of 400° C. and preferably at temperatures in the range of 450° C. to 700° C. These reactions are often referred to as exhaustive chlorinations.

It is also well known that the production of carbon tetrachloride and perchloroethylene is favored by the maintenance of an excess of chlorine in the reaction zone. Less reaction volume is required and by-product production is decreased. It is also possible to produce predominantly, carbon tetrachloride by this scheme without resorting to the more expensive techniques of recycling perchloroethylene, increasing reactor pressure, or increasing the size of the reactor.

In order to maintain an excess of chlorine in the reaction zone it is necessary to separate the unreacted chlorine in the reactor effluent from both the by-product hydrogen chloride and the chlorinated hydrocarbons which are produced. Unreacted chlorine, if not recovered from the reactor effluent, will represent a considerable economic loss to the process. Furthermore, unreacted chlorine constitutes a contaminant in the hydrogen chloride by-product and it must be removed before the hydrogen chloride is useful for other industrial purposes.

Another problem encountered when operating at substantial excesses of chlorine is that it is difficult to control the initial chlorination reaction rate. Since the chlorination of lower hydrocarbons takes place at extremely high temperatures the initial reaction may proceed at an explosive rate if not suitably tempered.

Recovery of excess chlorine from the process is usually accomplished by means of one of two processes. In the "wet quench" method the reactor effluent containing unconverted by-product hydrogen chloride and chlorinated hydrocarbons is introduced below the surface of an aqueous solution of hydrogen chloride in water. The chlorinated hydrocarbons are instantaneously cooled and condensed; the hydrogen chloride is dissolved in the water and the chlorine vapor which remains uncondensed is, after a clean-up water scrubbing, recycled via a compressor to the chlorination reactor.

The primary draw-back inherent in this process scheme is the requirement for chlorine scrubbing and compression facilities to supply the unreacted chlorine to the thermal chlorination reactor.

A significant improvement over the "wet quench" scheme was made in U.S. Patent No. 2,442,324. This patent taught the quenching of reactor effluent in an anhydrous chlorocarbon medium. The chlorinated hydrocarbons in the effluent are cooled and condensed in the chlorocarbon medium; the by-product hydrogen chloride and chlorine vapors are separated in a water scrubber and the gaseous chlorine after sulphuric acid scrubbing to remove traces of water is recycled via a compressor to the reactor.

Still a further improvement in separating and recycling excess chlorine to the chlorination reactor is disclosed in our copending application Ser. No. 477,463. By the process disclosed therein, the hydrogen chloride can be separated from the chlorine without resorting to a water scrubbing system. Even in this process, however, considerable equipment is necessary to separate the chlorine and hydrogen chloride and recycle the former to the chlorination reactor.

A problem therefore still exists in the art of carbon tetrachloride-perchloroethylene manufacture in maintaining an excess of chlorine in the reaction zone and at the same time minimizing the equipment necessary to separate the unconverted chlorine and recycle it to the reaction zone.

It is a purpose of this invention to provide a process whereby light hydrocarbons can be thermally chlorinated in the presence of an excess of elemental chlorine.

It is a further purpose of this invention to provide a process whereby an excess of chlorine can be maintained without incurring the considerable expense of chlorine recovery and recycle equipment.

It is yet a further purpose of this invention to reduce the dangers inherent in contacting the light hydrocarbons with an excess amount of elemental chlorine.

It is still another primary purpose of this invention to provide a process whereby the size of the thermal chlorination reactor can be reduced, the amount of heavy by-products formed in the reactor can be minimized and the production of carbon tetrachloride relative to perchloroethylene can be substantially increased, if such production ratio is desired.

It has now been discovered that excess chlorine in the effluent of the thermal chlorination reactor can be easily recovered by reacting chlorine non-exhausively with a light hydrocarbon. The partial chlorination product of the reaction has a substantially higher boiling point than the elemental chlorine in the reactor effluent and is therefore more easily separated from the other components of the effluent than elemental chlorine.

This non-exhaustive reaction of excess chlorine with ethylene or propylene or other unsaturated light hydrocarbons takes place at relatively mild conditions. At these conditions any free chlorine in the effluent of the thermal chlorination reactor can be quantitatively removed by reaction with the light unsaturates. The chlorine values as partially chlorinated hydrocarbons are much more easily removed from the total reactor effluent than is free chlorine. The partially chlorinated hydrocarbons can be used as a feed to the thermal chlorination or may be recovered as by-products.

The direct chlorination of light unsaturated hydrocarbons to partially chlorinated chlorocarbons is also well known in the art. U.S. Patents Nos. 2,547,139, 2,393,367 and 2,601,322 are among the patents which disclose the conditions under which chlorine and light hydrocarbons can be reacted. Generally speaking, no catalysts are necessary and complete reaction takes place if the chlorine and hydrocarbon are contacted in the presence of a medium which may consist of the chlorination product.

In order to better set forth the invention described above, attention is now directed to FIGURE I.

The entire stoichiometric quantity of chlorine required to produce the desired amounts of carbon tetrachloride and perchloroethylene is introduced via line 1 to high temperature exhaustive chlorination reactor 2. A recycle stream of partially chlorinated hydrocarbons from the secondary chlorination reactor to be described hereinafter is also introduced into high temperature chlorination reactor 2 via line 3. The exhaustive chlorination of the partially chlorinated hydrocarbons takes place at a temperature between 400° C. and 700° C. and at pressure between atmospheric and 50 p.s.i.g.

The reactor effluent, containing carbon tetrachloride, perchloroethylene, by-product hydrogen chloride and unreacted chlorine passes via line 4 to quench vessel 5. In quench vessel 5 the hot reactor effluent gases are contacted with a circulating stream of carbon tetrachloride and perchloroethylene; the considerable sensible heat in the reactor effluent stream is removed therein. A portion of the quench medium is removed via line 6 and cooled in heat exchanger 7 and then returned via line 8 to quench vessel 5.

The net effluent from quench vessel 5 is a cooled vapor stream containing all of the crude chlorinated hydrocarbons, the by-product hydrogen chloride and unconverted chlorine. This stream passes via line 9 to secondary chlorination reactor 10. In this reactor the aforementioned stream is contacted with the net plant feed of ethylene or propylene or other light unsaturate and an addition chlorination reaction is allowed to proceed.

All of the chlorine in the quenched reactor effluent is reacted with olefin in secondary chlorination reactor 10. The olefin is introduced via line 14. If ethylene or propylene is used, for example, ethylene dichloride or propylene dichloride are formed. Secondary chlorination reactor 10 will typically contain a large quantity of partially chlorinated or totally chlorinated hydrocarbon or mixtures thereof and suitable provision will be made to remove the considerable exothermic heat of reaction of the chlorine and light hydrocarbon. The operating temperature of the secondary chlorination reactor will generally be in the range of 100 to 300° F. and it may operate from atmospheric to 100 p.s.i.g. depending upon the particular compounds in the liquid medium contained therein.

Hydrogen chloride, now free of chlorine and containing small equilibrium amounts of chlorinated hydrocarbons is removed from the secondary chlorination reactor via line 11. The chlorinated hydrocarbons may be easily separated from the hydrogen chloride by low temperature separation techniques or scrubbing techniques well known to the art and passed via line 15 to secondary chlorination reactor 10.

A liquid stream containing essentially all of the totally chlorinated and partially chlorinated hydrocarbons formed in the process is removed from secondary chlorination reactor 10 via line 12. This mixture is fractionated in fractionation train 13 to recover carbon tetrachloride, or perchloroethylene fractions for recycle to the exhaustive chlorination reactor, product streams and a stream of partially chlorinated hydrocarbon for recycle to the chlorination reactor. Depending upon the hydrocarbon feed stock and the partially chlorinated derivative thereof which is produced in the secondary chlorination reactor 10 the fractionation train will differ in design.

Where ethylene is partially chlorinated to ethylene dichloride which is in turn used as the feed to the exhaustive chlorination reactor a somewhat different technique must be used to separate the recycle ethylene dichloride. FIGURE II shows the scheme which is used in this embodiment of the invention.

The entire stoichiometric quantity or net plant feed of chlorine required to produce the desired amount of carbon tetrachloride and perchloroethylene is introduced via line 51 to high temperature exhaustive chlorination reactor 52. A recycle stream of crude ethylene dichloride is also introduced into high temperature chlorination reactor 52 via line 53.

The reactor effluent, containing carbon tetrachloride, perchloroethylene, by-product hydrogen chloride and unreacted chlorine passes via line 54 to quench vessel 55 wherein the hot reactor effluent gases are contacted with a circulating stream of crude carbon tetrachloride and perchloroethylene. The considerable sensible heat in the reactor effluent is absorbed in the quench medium. A portion of the quench medium is removed from quench vessel 55 via line 56, is cooled in heat exchanger 57 and is returned via line 58 to quench vessel 55.

A vapor stream containing carbon tetrachloride, perchloroethylene, hydrogen chloride and chlorine is removed from quench vessel 55 via line 59 and passed to scrubber 60. In this unit the vapor stream is contacted with a refrigerated stream of perchloroethylene introduced via line 61. The chlorocarbon (chlorinated hydrocarbon) content in the vapor stream is substantially removed and the refrigerated perchloroethylene is passed via line 62 back to quench vessel 55. By removing all chlorocarbon prior to the secondary chlorination reaction a mixture of ethylene dichloride and carbon tetrachloride is avoided. This mixture is difficult to separate and considerable economies are gained by operating in this fashion.

The scrubbed vapor stream containing hydrogen chloride and chlorine and only a trace of perchloroethylene is passed via line 63 to secondary chlorination reactor 64 wherein the partial addition chlorination reaction takes place as described in connection with FIGURE I. The ethylene is added via line 83.

A stream of hydrogen chloride containing portions of ethylene dichloride passes from secondary chlorination reactor 64 via line 65 to refrigerator 66. The vapor mixture is cooled therein and passes via line 67 to separator 68 wherein condensed ethylene dichloride is accumulated and passed via line 69 to secondary chlorination reactor 64. By-product hydrogen chloride free of chlorine passes out of the process via line 70.

The crude ethylene dichloride is removed from secondary chlorination reactor 64 via line 71. It is then passed via line 53 to the high temperature exhaustive chlorination reactor 52; a portion may be passed via line 72 to a monovinyl chloride plant for purification and cracking.

A crude mixture of carbon tetrachloride and perchloroethylene are removed from quench vessel 55 via line 73 to refining column 74 wherein a purified carbon tetrachloride stream is removed as an overhead product via line 75. Perchloroethylene and heavier by-products are removed from the bottom of refining column 74 via line 76 and are passed to purification column 77 wherein perchloroethylene is purified of the heavier by-products formed in the exhaustive chlorination reaction. Refined perchloroethylene is removed from column 77 via line 78. A portion is recycled via line 79 and refrigerator 80 to line 61 and scrubber 60 wherein it is used to absorb the chlorocarbons in the vapor coming from quench vessel 55. The net make of perchloroethylene is removed via line 81. The heavier residue and by-products of the exhaustive chlorination are removed from column 77 via line 82.

It can be seen from the foregoing that it is possible to maintain an excess of chlorine in the chlorination reactor gases and yet not incur the penalties of providing chlorine recovery and recycle equipment. A typical material balance has been prepared to illustrate even more clearly the process described herein.

EXAMPLE I

The following material balance is for a production unit which produced 100 lbs. of chlorocarbon in a 60/40 weight ratio of carbon tetrachloride to perchloroethylene. The stream numbers refer to the stream numbers on FIGURE I.

| Stream | Component | Mols | Fig. I Stream No. |
|---|---|---|---|
| Feed to chlorination reactor. | Ethylene dichloride | 0.436 | 3 |
|  | Chlorine | 2.134 | 1 |
| Products from chlorination reactor. | Carbon tetrachloride | 0.39 | 4 |
|  | Perchloroethylene | 0.241 | 4 |
|  | Hydrogen chloride | 1.744 | 4 |
|  | Chlorine | 0.436 | 4 |
| Feed to secondary chlorination reactor. | Hydrogen chloride | 1.744 | 9 |
|  | Chlorine | 0.436 | 9 |
|  | Ethylene | 0.436 | 14 |
| Products from secondary chlorination reactor. | Hydrogen chloride | 1.744 | 11 |
|  | Ethylene dichloride | 0.436 | 3 |

The feed to the chlorination reactor contains 25.7% excess chlorine over the stoichiometric quantity required to produce 100 lbs. of chlorocarbon in a 60/40 weight ratio.

From the foregoing example it can be seen that an excess of chlorine can be maintained in a process for the production of carbon tetrachloride and perchloroethylene without installing chlorine recycle facilities. An even greater excess of chlorine can be maintained in the high temperature chlorination reactor if the carbon tetrachloride or perchloroethylene process unit is combined with a unit for the production of a partially chlorinated derivative of the light hydrocarbon feed stock.

If, for example, a monovinyl chloride plant requiring ethylene dichloride as a feed stock is combined with a carbon tetrachloride-perchloroethylene unit, the large requirements of ethylene dichloride will permit the maintenance of very high excesses of chlorine in the carbon tetrachloride-perchloroethylene chlorination reactor. The following example demonstrates this added benefit of combining the two processes.

EXAMPLE II

The following material balance is for a production unit which produces sufficient ethylene dichloride for 100 lbs. of monovinyl chloride together with 100 lbs. of chlorocarbon in a 60/40 weight ratio of carbon tetrachloride to perchloroethylene. The stream numbers refer to the stream numbers on FIGURE II.

| Stream | Component | Mols | Fig. II Stream No. |
|---|---|---|---|
| Feed to chlorination reactor. | Ethylene dichloride | 0.436 | 53 |
|  | Chlorine | 3.734 | 51 |
| Products from chlorination reactor. | Carbon tetrachloride | 0.39 | 54 |
|  | Perchloroethylene | 0.241 | 54 |
|  | Hydrogen chloride | 1.744 | 54 |
|  | Chlorine | 2.036 | 54 |
| Feed to secondary chlorination reactor. | Hydrogen chloride | 1.744 | 63 |
|  | Chlorine | 2.036 | 63 |
|  | Ethylene | 2.036 | 83 |
| Products from secondary chlorination reactor. | Hydrogen chloride | 1.744 | 70 |
|  | Ethylene dichloride | 2.036 | 71 |
| Ethylene dichloride to mono vinyl chloride. | ----do-------- | 1.60 | 72 |

The feed to the chlorination reactor contains 121.77% excess chlorine over the stoichiometric quantity required to produce 100 lbs. of chlorocarbon in a 60/40 weight ratio.

The hydrocarbon feed stocks which are contemplated for use in this invention have from two to four carbon atoms and have some degree of unsaturation. The preferred commercial feed stocks are ethylene and propylene.

In view of the foregoing disclosures, variations and modifications thereof will be apparent to one skilled in the art, and it is intended to include within the invention all such variations and modifications except as do not come within the scope of the appended claims.

I claim:

1. In a plant process for the production of carbon tetrachloride and perchloroethylene by the chlorination of light unsaturated hydrocarbons having 2 to 3 carbon atoms with excess molecular chlorine, the improvement comprising feeding to a first reaction zone maintained at a temperature in the range of 400 to 700° C. and a pressure in the range of atmospheric to 50 p.s.i.g. the net plant fed of said chlorine and a recycle stream of partially chlorinated hydrocarbons, exhaustively chlorinating said partially chlorinated hydrocarbons in said first reaction zone and passing the gaseous effluent therefrom to a quench vessel to contact a liquid quench medium consisting essentially of a circulating stream of crude carbon tetrachloride and perchloroethylene to remove a substantial amount of the sensible heat of said gaseous effluent, feeding to a second reaction zone maintained at a temperature in the range of 100 to 300° F. and a pressure in the range of atmospheric to 1000 p.s.i.g. the resultant gaseous effluent which contains all the crude chlorinated hydrocarbon, by-product hydrogen chloride and unconverted chlorine and the net plant feed of said light unsaturated hydrocarbons, partially chlorinating said light unsaturated hydrocarbons in said second reaction zone under conditions such that substantially only addition chlorination occurs and all of the molecular chlorine in said resultant gaseous effluent is reacted, removing from said second reaction zone a liquid stream containing exhaustively chlorinated and partially chlorinated hydrocarbons, fractionating said liquid stream to recover product carbon tetrachloride and perchloroethylene and to separate partially chlorinated hydrocarbons, and utilizing said separated partially chlorinated hydrocarbons as said recycle stream to said first reaction zone.

2. A process according to claim 1 including removing gaseous hydrogen chloride free of molecular chlorine from said second reaction zone, separating entrained chlorinated hydrocarbons from said hydrogen chloride and recycling the separated chlorinated hydrocarbons to said second reaction zone.

3. In a plant process for the manufacture of carbon tetrachloride and perchloroethylene by the chlorination of ethylene with excess molecular chlorine, the improvement comprising feeding to a first reaction zone maintained at a temperature in the range of 400 to 700° C. and a pressure in the range of atmospheric to 50 p.s.i.g. the net plant feed of said chlorine and a recycle stream of ethylene dichloride, exhaustively chlorinating said ethylene dichloride in said first reaction zone and passing the gaseous effluent to a quench vessel to contact a liquid quench medium consisting essentially of a circulating stream of crude carbon tetrachloride and perchloroethylene to remove a substantial amount of the sensible heat of said gaseous effluent, scrubbing resultant gaseous effluent which contains all the crude chlorinated hydrocarbon, by-product hydrogen chloride and unconverted chlorine with refrigerated perchloroethylene to remove chlorinated hydrocarbons in the scrubber bottoms, recycling said scrubber bottoms to said quench vessel, passing the stream of liquid quench medium from said quench vessel to a first refining column to remove product carbon tetrachloride as overhead and passing the bottoms therefrom to a second refining column to remove product perchloroethylene as overhead, a portion of the perchloroethylene overhead being refrigerated and recycled to the scrubbing step as absorbent, feeding to a second reaction zone maintained at a temperature in the range of 100 to 300° F. and a pressure in the range of atmospheric to 100 p.s.i.g. the overhead from the scrubbing step and the net plant feed of ethylene, partially chlorinating said ethylene in said second reaction zone under conditions such that substantially only addition chlorination occurs and all of the molecular chlorine in the overhead from said scrubbing step is reacted, removing from said second reaction zone a liquid stream of product ethylene dichloride, and utilizing a portion thereof as said recycle stream to said first reaction zone.

4. A process according to claim 3 including removing gaseous hydrogen chloride free of molecular chlorine from said second reaction zone, separating entrained chlorinated hydrocarbons from said hydrogen chloride and recycling the separated chlorinated hydrocarbons to said second reaction zone.

References Cited

UNITED STATES PATENTS

| 2,377,669 | 6/1945 | Brown et al. | 260—658 |
| 2,393,367 | 1/1946 | Hammond | 260—660 |
| 2,442,324 | 5/1948 | Heitz et al. | |
| 2,841,243 | 7/1958 | Hooker et al. | |

LEON ZITVER, Primary Examiner

M. M. JACOB, Assistant Examiner

U.S. Cl. X.R.

260—660, 662, 664